Patented Nov. 13, 1923.

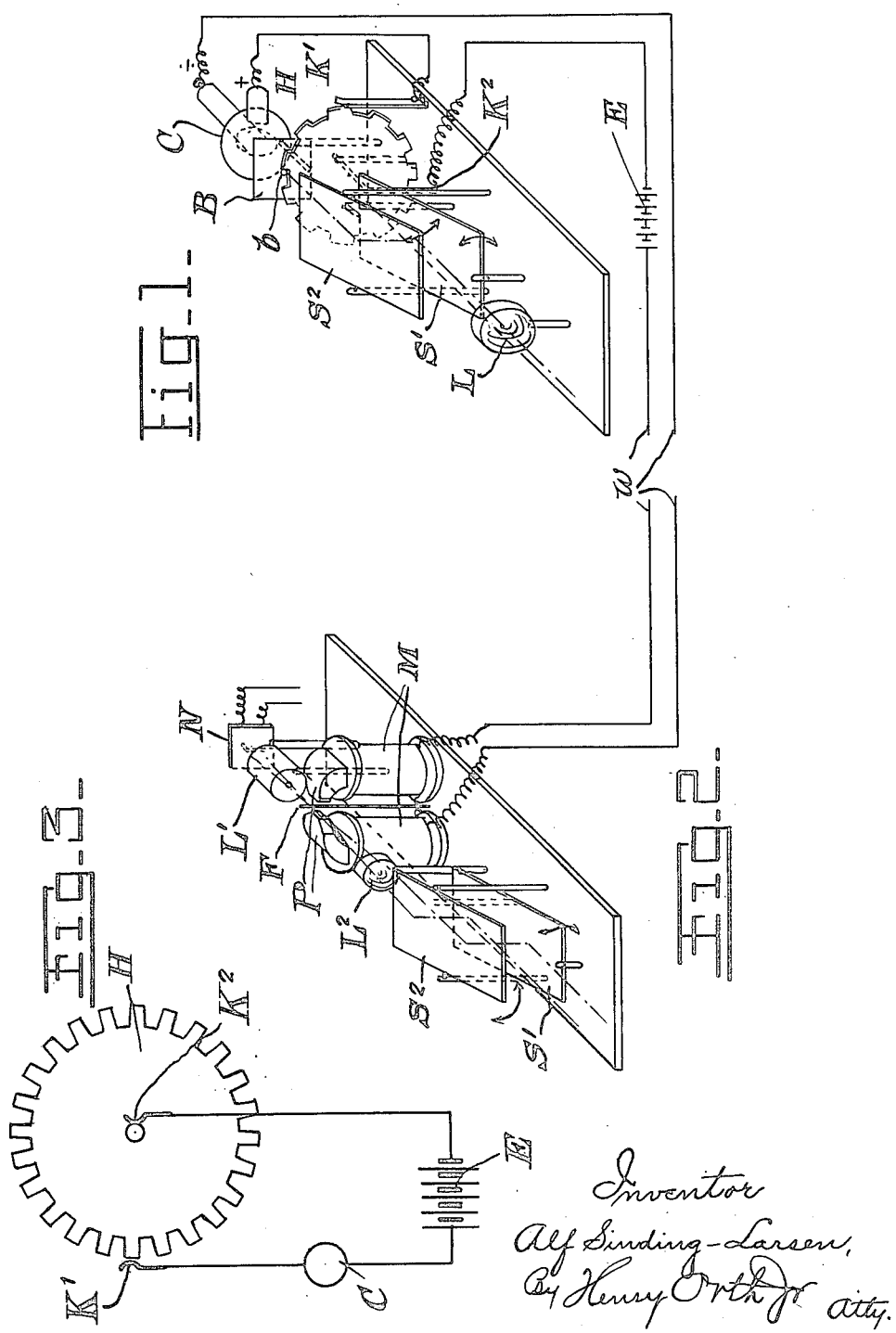

1,473,882

UNITED STATES PATENT OFFICE.

ALF SINDING-LARSEN, OF VESTRE AKER, NEAR CHRISTIANIA, NORWAY, ASSIGNOR TO A/S TELOCLE, OF CHRISTIANIA, NORWAY.

PICTURE TRANSMISSION.

Application filed September 16, 1919. Serial No. 324,249.

*To all whom it may concern:*

Be it known that I, ALF SINDING-LARSEN, a subject of the King of Norway, residing at Vestre Aker, near Christiania, Norway, have invented certain new and useful Improvements in Picture Transmission; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention particularly relates to photo electric cells with alkali metal cathode such as for instance cells of the Elster-Geitel-type, and has for its object to improve the photo electric effect of these cells.

In spite of their highly developed sensitiveness to light, cells of this type have not been largely used for the long distance electric transmissions of pictures or the like for the reason that the currents released by these cells under tensions below the point at which an independent continuous discharge takes place in the cell are infinitesimal. See Physikalische Zeitschrift No. 11 pages 257–262, of 1910; No. 12, page 609, of 1911, and No. 14, pages 741–742, of 1913; also Widemann's "Annalen der Physik," No. 48, 1893, page 625.

It has now been found that cells of this type may be utilized for releasing considerably stronger currents by variations of light, if the cell is fed with currents the tension of which is so adjusted that it is capable of maintaining discharge even after the exterior illumination is shut off while it is not sufficiently strong to initiate a discharge after the current has been once interrupted.

According to the present invention the photo electric cell is fed with a current the tension of which is adjusted as above indicated, while at the same time the current is interrupted periodically at short intervals by means of a suitable rapidly acting interruptor.

The interruption of the current may be attained by using alternating current or interrupted direct current. The alternating current may be generated by alternating induction on a direct current, whereby it is possible to obtain a current curve, which lies between a pure alternating current and a pure undulating or interrupted direct current. The interruptor may conveniently be so arranged in combination with the light, that all exterior illuminations of the cell are shut off during the periods in which the cell current is interrupted. Further it has proven to be advantageous in order to counteract the after effect of the discharge to short-circuit the electrode between each current period.

In the drawing is diagrammatically illustrated an arrangement for long distance transmission of pictures which is provided with arrangements adapted for the application of the present method.

Figure 1 represents a sending station.

Fig. 2 a receiving station, and

Fig. 3 a diagrammatic detail of the sending apparatus.

The arrangement comprises a sending apparatus Fig. 1 and receiver apparatus Fig. 2.

The sending apparatus as usual includes a lens L behind which there is mounted in usual manner two mirrors $S^1$ $S^2$ oscillating about axes which are perpendicular to each other, said mirrors transmitting in a known manner the picture received by lens L in a continuous series of points to a small opening $b$ in the screen B. The mechanism for operating these mirrors consists of electromagnets, as illustrated in U. S. Patent 1,175,313.

Behind said opening the photo electric cell C is located, said cell being under tension from battery E. The supply of current to the cell takes place through an interrupting arrangement comprising a toothed disk H. The axis of the disk is connected with a contact $K^2$, while the contact $K^1$ touches the projecting teeth of the disk. It has been proven to be of advantage in order to obtain a good effect that the contact between disk H and contact $K^1$ should be bad, and the best effects are obtained, when there is a distance of about 1/1000 mm. between the contact and the teeth of the disk.

The rotating disk acts at the same time as interruptor of the light in front of the opening in screen B in such a manner that the light rays are interrupted synchronously with the interruption of the current between K¹ and H.

The current oscillations released by the photo electric cell are transmitted in the usual manner through the long distance wires w to the receiving apparatus which in a known manner comprises an electromagnet M between the poles P of which there is located a magnetized steel rod F the characteristic period of oscillation of which corresponds with the period of oscillation of the interrupted current from the sender. Said oscillating rod F acts as interrupter of the light ray from lamp N through lens arrangement L¹ to the collecting lens L² and the mirrors S¹ S² which oscillate synchronously with the corresponding mirrors at the sending station by mechanism identical with that at the sending station and thereby in the mirror, specified for instance in U. S. Patent No. 1175313 transmits the picture received by lens L to the screen of the receiving station As stated above the arrangement here specified does not form a part of the invention as this manner of transmitting pictures is known for instance from the patent above referred to, and this system is specified here solely with the object of illustrating an arrangement where the present invention may be utilized.

Claims:

1. The method of increasing the effect of photo electric cells, which comprises supplying to said cells an interrupted current whose tension is sufficiently high to maintain the discharge after interruption of the current but is insufficient to charge the cell when not illumined.

2. The method of increasing the effect of photo electric cells, which comprises supplying to said cells an interrupted current whose tension is sufficiently high to maintain the discharge after interruption of the current, but is insufficient to charge the cell when not illumined, and short-circuiting the electrodes of such cells during the period of interruption of the electric current supply.

3. The method of increasing the effect of photo electric cells, which comprises supplying to said cells an interrupted current whose tension is sufficiently high to maintain the discharge after interruption of the current but is insufficient to charge the cell when not illumined, the illumination of said cells being in synchronism with the interruption of current.

4. The method of increasing the effect of photo electric cells, which comprises supplying to said cells an interrupted current whose tension is sufficiently high to maintain the discharge after interruption of the current but is insufficient to charge the cell when not illumined, the illumination of said cells being in synchronism with the interruption of current, and short-circuiting said cells during the period of interruption and illumination thereof.

5. The method of increasing the effect of photo electric cells, which comprises supplying a current across a discharge gap to an interrupting device supplying interrupted current to such a cell in synchronism with interruptions of light to the cell.

In testimony that I claim the foregoing as my invention, I have signed my name in presence of two subscribing witnesses.

ALF SINDING-LARSEN.

Witnesses:
Mozins Bugge,
Gjertrud Fabritius.